United States Patent

Keip

[11] Patent Number: 5,921,739
[45] Date of Patent: Jul. 13, 1999

[54] INDEXING PARTS TRAY DEVICE

[76] Inventor: Charles P. Keip, 1052 Byron Rd., Byron Center, Mich. 49315

[21] Appl. No.: 08/797,400

[22] Filed: Feb. 10, 1997

[51] Int. Cl.⁶ .................................................. B65G 60/00
[52] U.S. Cl. .................. 414/331; 414/788.7; 414/788.8; 414/237; 211/126
[58] Field of Search ............................ 211/126; 414/331, 414/237, 796.7, 796.8, 795.3, 795.2, 788.7, 788.8

[56] References Cited

U.S. PATENT DOCUMENTS

| 3,164,259 | 1/1965 | De'Caccia . |
| 3,583,579 | 6/1971 | Triggs et al. ..................... 414/788.8 X |
| 3,784,024 | 1/1974 | Kristy . |
| 4,588,341 | 5/1986 | Motoda ............................. 414/788.8 X |
| 5,248,049 | 9/1993 | Murphy, Sr. . |

FOREIGN PATENT DOCUMENTS

| 2153070 | 5/1973 | Germany ............................ 414/788.8 |
| 137230 | 8/1982 | Japan .................................. 414/788.8 |
| 208432 | 8/1988 | Japan .................................. 414/788.7 |
| 405000728 | 1/1993 | Japan .................................. 414/788.7 |

*Primary Examiner*—Frank E. Werner
*Attorney, Agent, or Firm*—Harpman & Harpman

[57] ABSTRACT

A multiple movable parts tray device having a plurality of interengaging trays that are selectively transferred between tray stacks. Engagement and lifting arms are provided that will independently engage and index the tray stacks allowing for simultaneous transfer of single trays between respective stacks.

12 Claims, 7 Drawing Sheets

INDEXING PARTS TRAY DEVICE

BACKGROUND OF THE INVENTION

Technical Field

This device relates to parts trays used in the manufacturing industry wherein parts are presented to work stations or transfer points, as needed. Multiple parts trays are constantly being cycled in and out as the contents of the trays are used.

Description of Prior Art

Prior art devices of this type have relied on a number of different parts container supply configurations wherein containers are constantly placed next to the point of use and then removed when emptied. Other examples of multiple tray devices can be seen in U.S. Pat. Nos. 5,248,049, 3,784,027 and 3,164,259.

In U.S. Pat. No. 5,248,049 a nut and bolt rotating tray caddy is disclosed having a horizontally oriented carousel carrying frame in which multiple trays are pivotally positioned on rotating arms.

U.S. Pat. No. 3,784,024 is directed to a rotating buffet food wheel wherein multiple containers for food display are pivotally suspended about a rotating ferris wheel like frame.

U.S. Pat. No. 3,164,259 discloses a parts container and support frame wherein container trays are suspended on wire frames rotatable on a central pivot point.

SUMMARY OF THE INVENTION

A parts supply tray and indexing system having a plurality of interengageable trays stacked in adjacent columns. An indexing mechanism selectively engages individual trays within each column lifting the respective columns for transfer of oppositely disposed trays in each column to the respective adjacent columns.

DESCRIPTION OF THE PREFERRED EMBODIMENT

Figure 1:
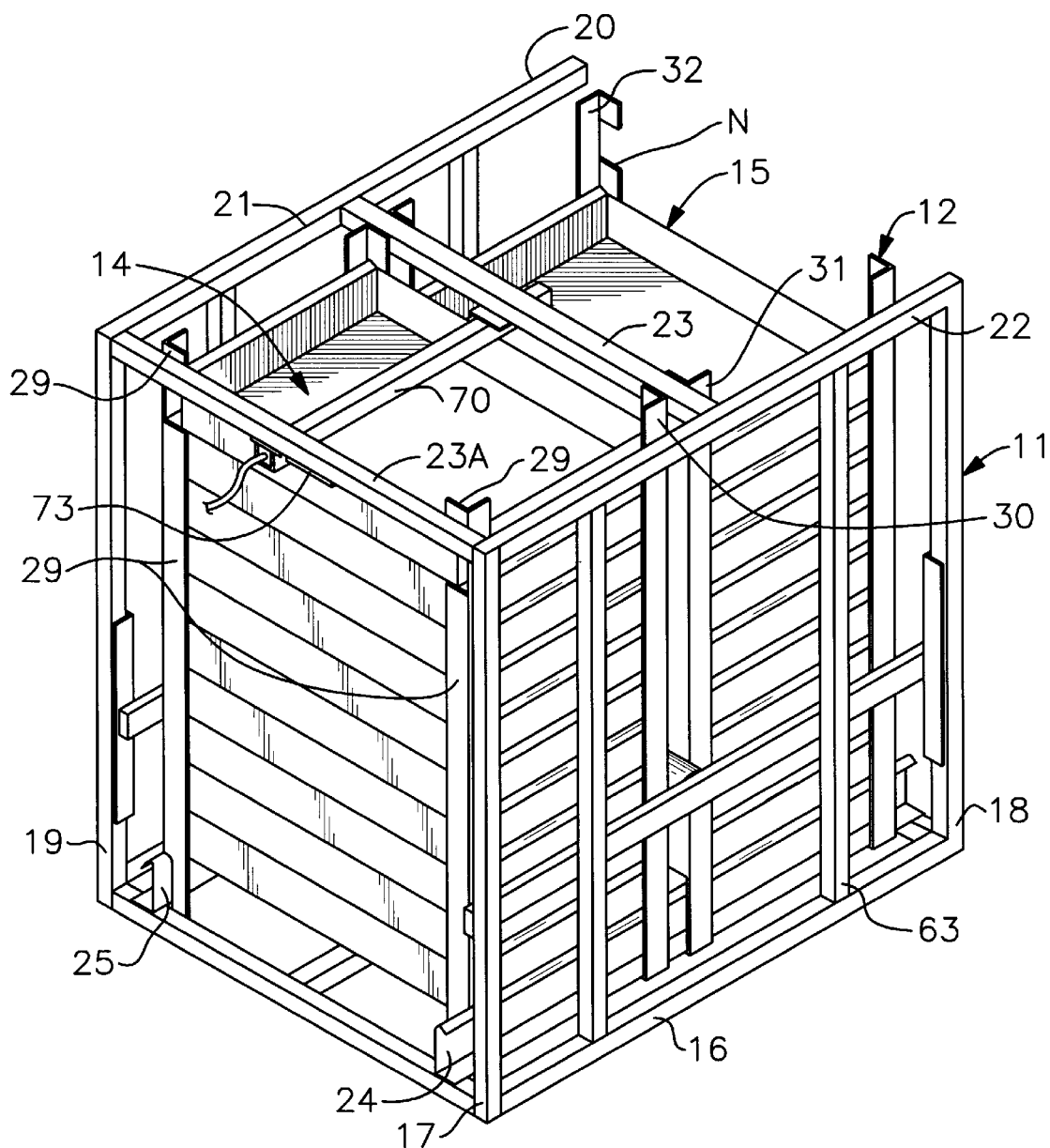
FIG. 1 is a perspective view of the invention with the indexing assembly broken away for clarity.

Referring to FIG. 1 of the drawings, an indexing parts tray device 10 of the invention can be seen having a main support frame 11 with a tray support and guide frame 12 and multiple parts tray 13 stacked in first and second tray columns 14 and 15 respectively. The main support frame 11 has a generally rectangular base 16 with respective upstanding corner support posts 17–20 extending therefrom. A pair of upper support elements 21 and 22 interconnect said respective support post pairs 17 and 18 and 19 and 20. A transverse connecting element 23 extends between said support elements 21 and 22. The tray support guide frame 12 has a pair of oppositely disposed parallel support and guide tracks 24 and 25, best seen in FIGS. 2, 3 and 4 of the drawings having a generally right angled shape portions 26 and 27 with an inturned compound angular support flange 28 extending therefrom.

Multiple pairs of upstanding tray guide elements 29 and 30, and 31 and 32 extend from the respective guide tracks 24 and 25 so as to be positioned about the respective tray columns 14 and 15 as best seen in FIG. 1 of the drawings, as will be well understood by those skilled in the art.

All of the tray guides 29–32 have an access notch adjacent their respective free ends indicated by N to accommodate trans-column tray transfer as will be described in greater detail hereinafter. The tray guide pairs 30 and 31 and 32 also have respective access notches adjacent the support and guide tracks 24 and 25 to allow for tray transfer between tray columns 14 and 15.

Figure 2:
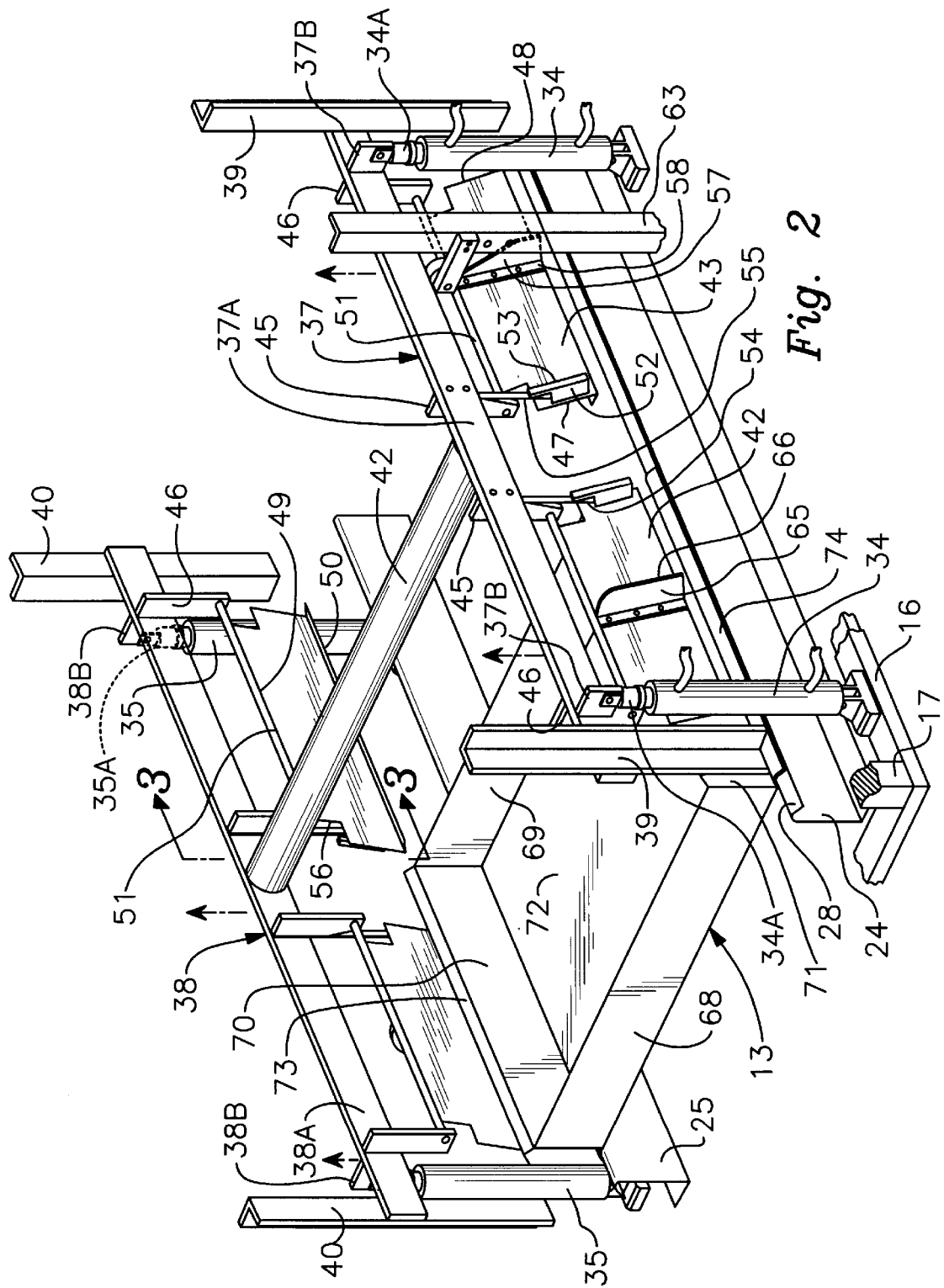
FIG. 2 is a perspective view of the tray engagement indexing and lifting portion of the device.
Figure 3:
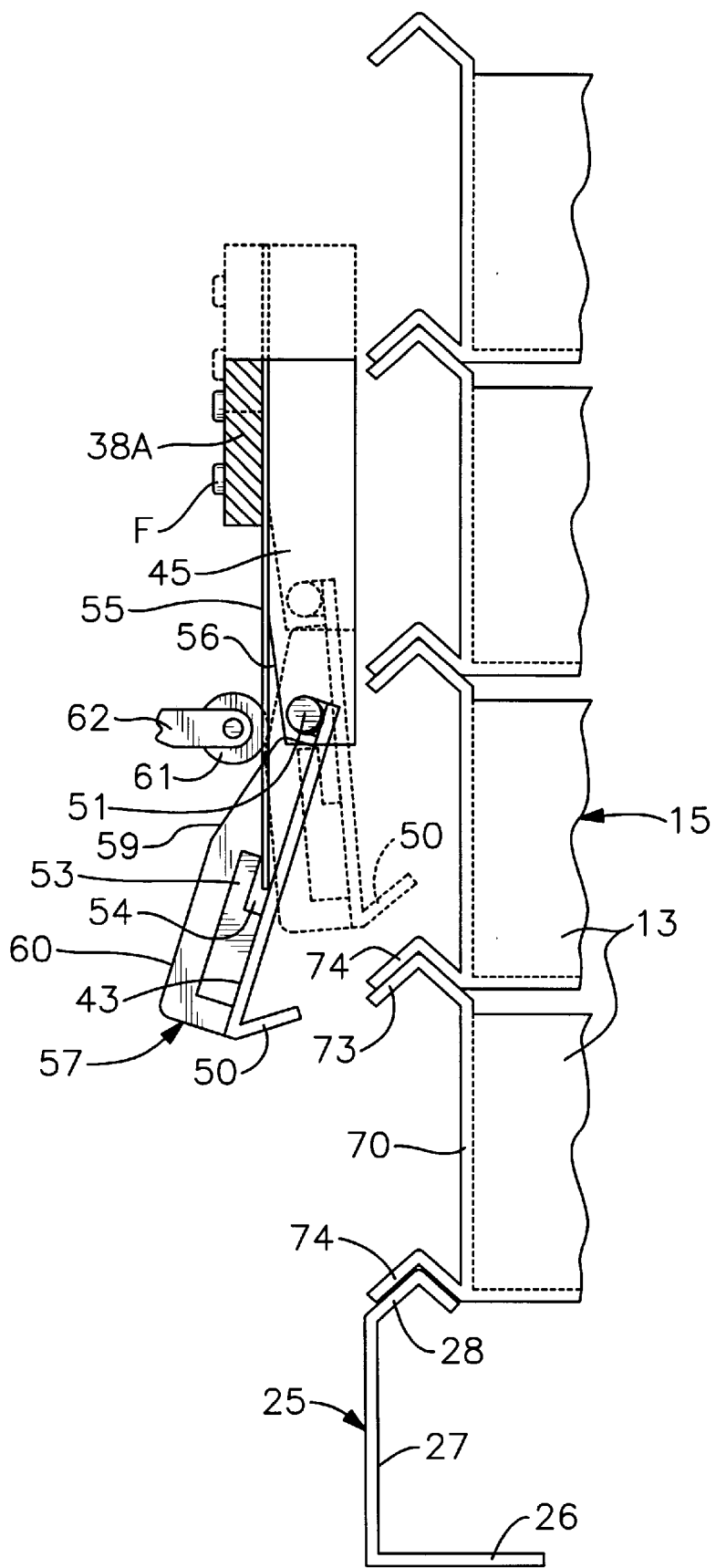
FIG. 3 is an enlarged partial side elevational view of one of the lifting arms positioned for engagement with a tray column.
Figure 4:
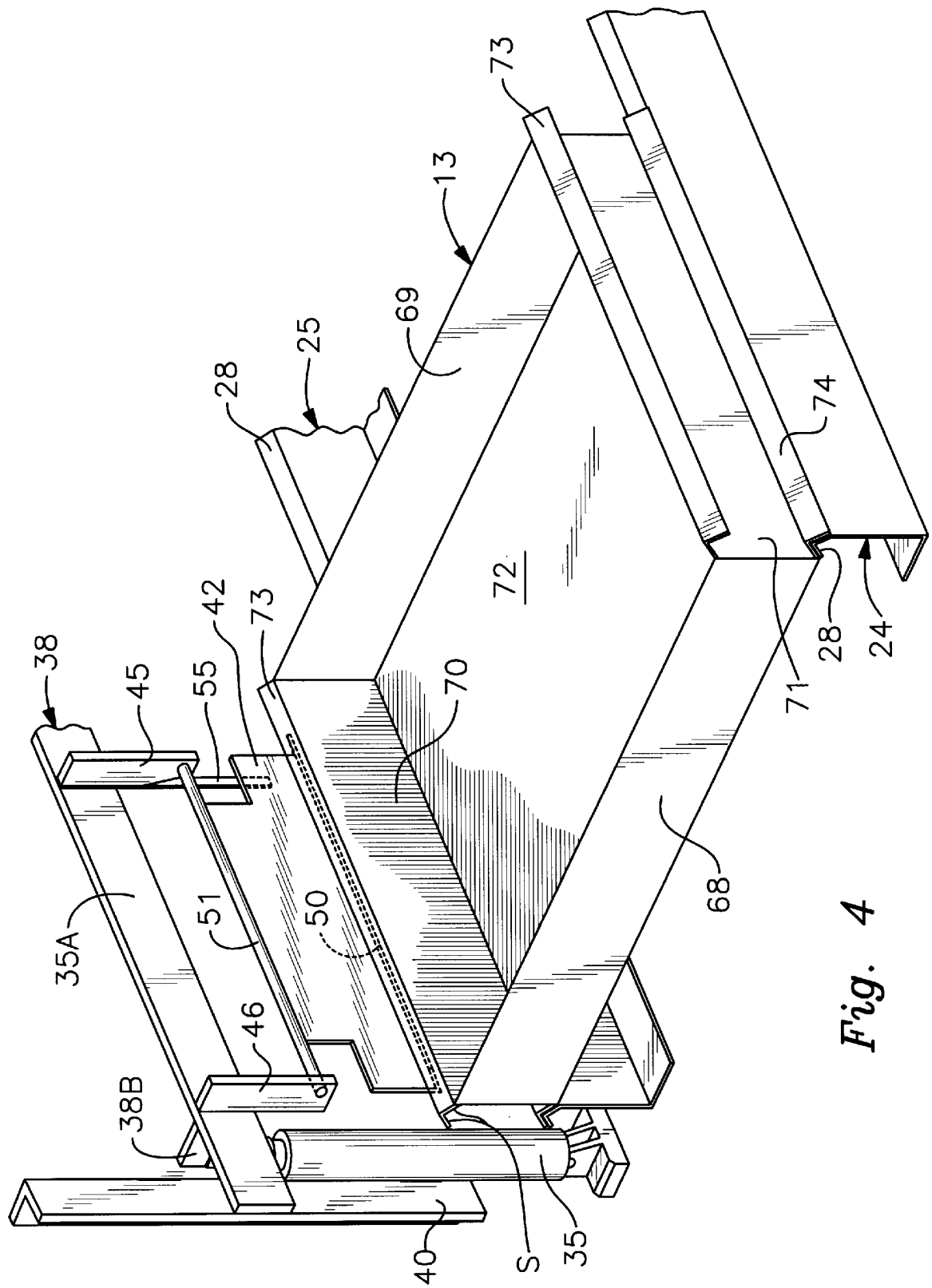
FIG. 4 is an enlarged perspective view of a parts tray of the invention within a portion of the indexing and support portion of the invention.

Referring now to FIGS. 2, 3, and 4 of the drawings, a tray indexing assembly can be seen having pairs of pneumatic piston and cylinder assemblies 34 and 35 secured to the base 16 in oppositely disposed parallel spaced relation to one another adjacent the respective guide tracks 24 and 25. The piston and cylinder assembly pairs 34 and 35 are engaged by piston rod fittings 34A and 35A respectively to actuation brackets 37 and 38 extending therebetween as best seen in FIG. 2 of the drawings. The actuation brackets 37 and 38 are identical having elongated attachment bars 37A and 38A each having right angular apertured mounting tabs 37B and 38B extending therefrom which the respective piston rod fittings 34A and 35A are secured.

Figure 10:
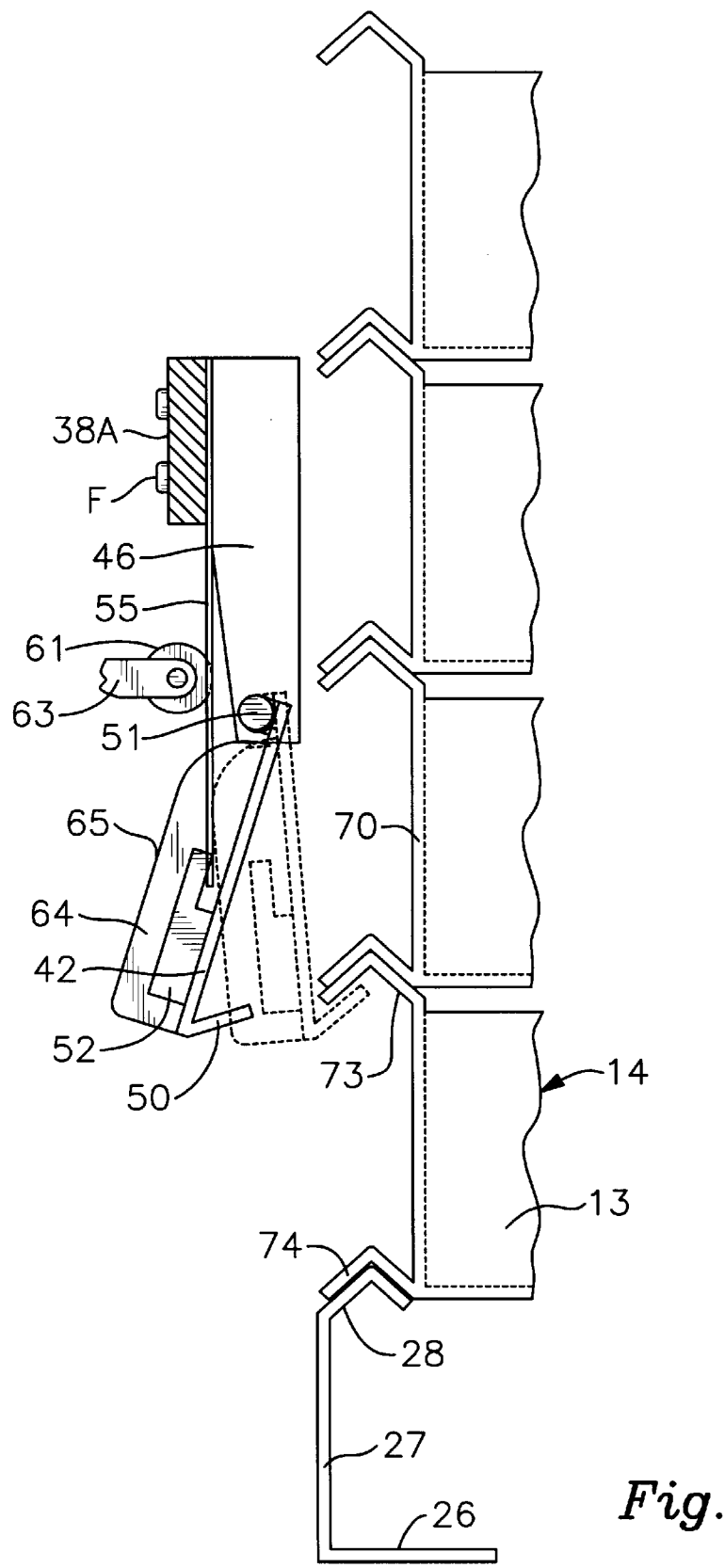
FIG. 10 is an enlarged partial side elevational view of one of the lifting arms positioned for initial engagement with a tray column.

Each of the attachment bars 37A and 38A have vertically oriented guide angles 39 and 40 on their respective free ends which are aligned for sliding registration against the respective corner support posts pairs 17 and 18, 19 and 20. The attachment bars 37A and 38A are interconnected by a cylinder 41 midway between their respective free ends. Each of the actuation brackets 37 and 38 have independent tray engagement arms 42 and 43 pivotally secured therefrom by apertured brackets 45 and 46 as best seen in FIGS. 2, 3, and 10 of the drawings.

The arms 43 are generally rectangular having oppositely disposed notched ends 47 and 48, a top edge 49 and an elongated inturned return angle flange 50. A support and pivot rod 51 is secured inwardly of the top edge 49 and extends beyond the respective ends 47 and 48 so as to be registerable between the hereinbefore described adjacent apertured brackets 45 and 46.

A spring engagement fitting is attached to the engagement arm 43 inwardly from the notched end 47 having a rectangular body member 52 with an integral extension 53 that defines a registration pocket 54 between the extension 53 and the arm 43 as best seen in FIG. 3 of the drawings. A leaf type spring 55 is secured between the apertured bracket 45 and attachment bar 37B by fasteners F and extends outwardly therefrom so as to be registerable within the registration pocket 54 thus spring-urging the engagement arm 43 away from the tray column 15. The same spring arrangement is also found on the tray engagement arms 44 which will be described in greater detail hereinafter.

The apertured brackets 45 are tapered along their spring effacing side at 56 to provide clearance for the springs 55 during use. A cam 57 is secured midway along each of said respective engagement arms 43 by an integral apertured attachment plate 58. The cam 57 defines an initial gradual inclined surface 59 extending from the rod 51 to a maximum engagement surface 60 that terminates with the engagement arm 43 opposite the return angle 50. Cam engagement rollers 61 are rotatably positioned on adjustable support arms 62 that extend from respective support posts 63 that extend between the base 16 and respective support elements 21 and 22 of the main support frame 11, best seen in FIGS. 1 and 2 of the drawings.

Referring to FIGS. 2–10 of the drawings, the tray engagement arms 44 can be seen pivotally secured to their respective apertured brackets 46 and 45 as hereinbefore described with each having a cam 64 with a cam surface 65. The cam 64 shown in solid lines in FIG. 10 with the first tray column 14 in relation thereto.

It will be evident that the cam surface 65 defines a radically inclined surface 66 extending from the rod 51 to a maximum engagement surface 67 that extends the remaining length of the cam. Thus, as illustrated, the respective cam engagement roller 61 (deleted for clarity in FIG. 2) will immediately engage the cam 64 shown in broken lines pivoting the respective oppositely disposed engagement arms 44 into their registration position with the adjacent parts tray therebetween.

Referring now to FIGS. 2, 3, and 4 of the drawings, the parts tray 13 can be seen having a generally rectangular overall shape with sidewalls 68 and 69, end walls 70 and 71 and an integral bottom 72. The end walls 70 and 71 extend beyond the corresponding horizontal planar surface defined by the vertical termination of the sidewalls 68 and 69 with angularly out-turned elongated flanges 73. It will also be seen that matching elongated flanges 74 extend in spaced relation thereto along the bottom edge of the respective sidewalls so as to provide flange engagement areas on both the upper end wall edge and lower bottom edge of the respective trays.

Each of the flanges 73 have opposing first and second intersecting angular surfaces (S) that form a registration angle therebetween that corresponds to the angular flange 28 on the guide tracks 24 and 25 and are correspondingly registerable with the return portion flange 50 on both of the tray engagement arms 44 and 45 as will be well understood by those skilled in the art.

Figure 5:
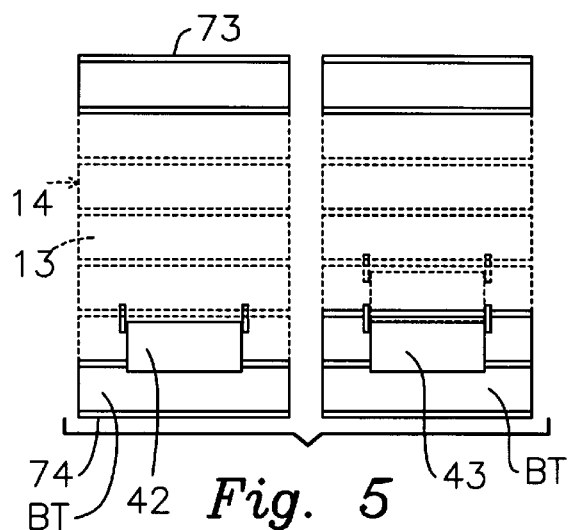
FIG. 5 is a graphic representation of indexing movement of the parts trays in rest position.

Referring to FIGS. 3, 5–9, and 10 of the drawings, parts tray engagement and indexing sequence are graphically illustrated. In FIG. 5, the tray columns 14 and 15 formed from multiple parts trays 13 stacked one on top of one another with the bottom tray BT, flanges 74 resting on the support and guide tracks 24 and 25. The trays 13 engage one another by the respective out-turned flanges 73 and 74 as best seen in FIGS. 3 and 10.

Initially, neither of the opposing engagement arm pairs 43 and 44 are engaged with the trays and associated tray columns 14 and 15. Upon activation of the device, the piston and cylinder assembly pairs 34 and 35 and the attached actuation brackets 37 and 38 move upwardly as indicated by the directional arrows shown in FIGS. 2, 3, and 10 of the drawings. It will seen that immediately the cam 64 on the engagement arm pairs 44 are engaged by the respective rollers 61 moving the respective engagement arms 44 immediately towards the tray column 14 registering engaging the return flanges 50 with the elongated flanges 73 on the bottom tray BT as seen in FIG. 10 of the drawings in broken lines lifting the tray column 14 vertically.

Correspondingly, the cams 64 on the opposing engagement arm pairs 43 are gradually engaged by their rollers 61, thus delaying full advancement and engagement of the arm pairs 43 with the tray column 15 until the next tray NT is reached. It will therefore be evident that the entire tray column 14 is lifted off the guide tracks 23 and 24 approximately five inches and that the tray column 15 is engaged and lifted only about a half inch leaving the bottom tray BT in place on the guide tracks 23 and 24 at the termination of the piston and cylinders 34 and 35 stroke as will be illustrated in FIG. 5.

Figure 6:
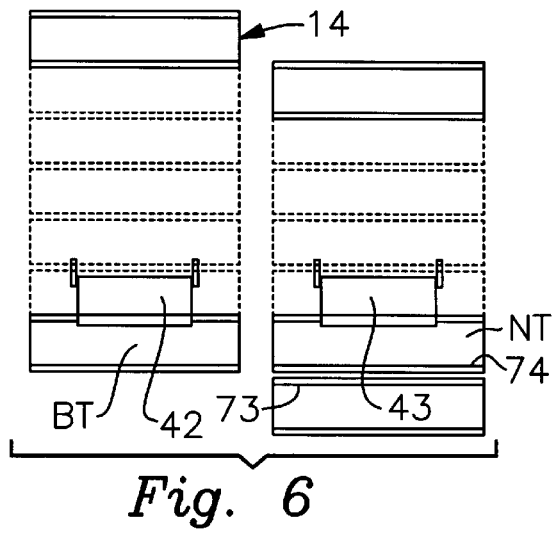
FIG. 6 is a graphic representation of indexing movement of the parts trays in engaged and moved position.

Referring to FIG. 6 of the drawings, the top tray TT of the tray column 14 and the bottom tray BT left on the guide tracks of the tray column 15 are simultaneously advanced to the opposite tray columns by a rodless cylinder assembly 70 as will be described in greater detail hereinafter.

Figure 8:
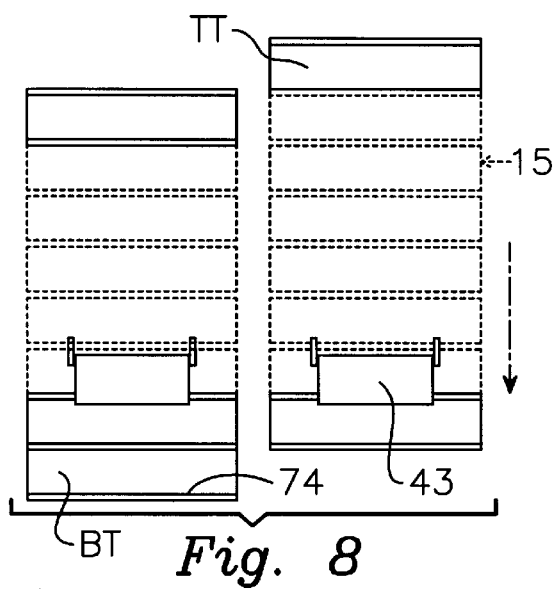
FIG. 8 is a graphic representation of indexing movement of the parts trays in completed index position.
Figure 9:
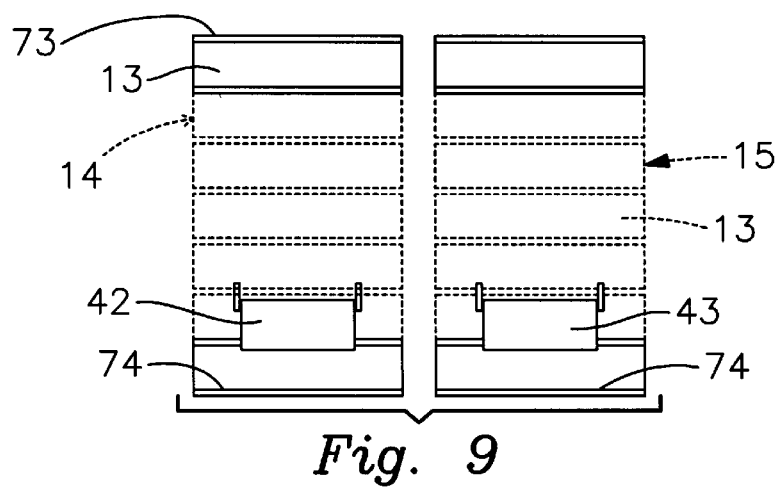
FIG. 9 is a graphic representation of the indexing movement of the parts trays in rest position.

FIG. 8 of the drawings shows the tray columns 14 and 15 as reconfigured by the tray movement. The piston and cylinder pairs 34 and 35 are then retracted, repositioning the tray column 14 down on top of the repositioned bottom tray BT from the tray column 15. The tray column 15 is lowered all the way down to the guide rails 23 and 24 and the respective engagement arm pairs 43 and 44 pivot away as the rollers 61 disengage from the respective cam surfaces illustrated in FIG. 9 of the drawings.

Figure 7:
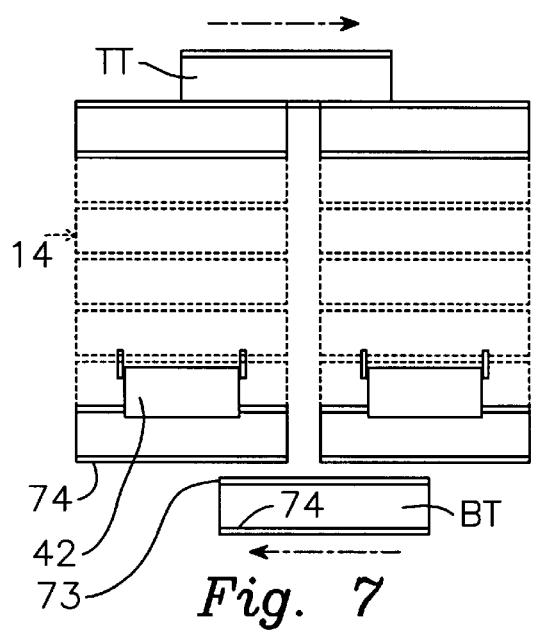
FIG. 7 is a graphic representation of indexing movement of the parts tray as individual trays are indexed to respective adjacent tray columns.

It should be noted that the relative height of the suspended tray columns 14 and 15 shown in FIG. 7 are not even wherein the elongated flanges 73 of the top tray TT in tray column 15 is approximately ⅜ inch lower than the correspondingly horizontally aligned elongated flanges 74 of the top tray in the tray column 14. It is this differential that allows the top tray TT to slide easily over and onto to adjacent column's top tray bridging the gap therebetween.

Figure 13:
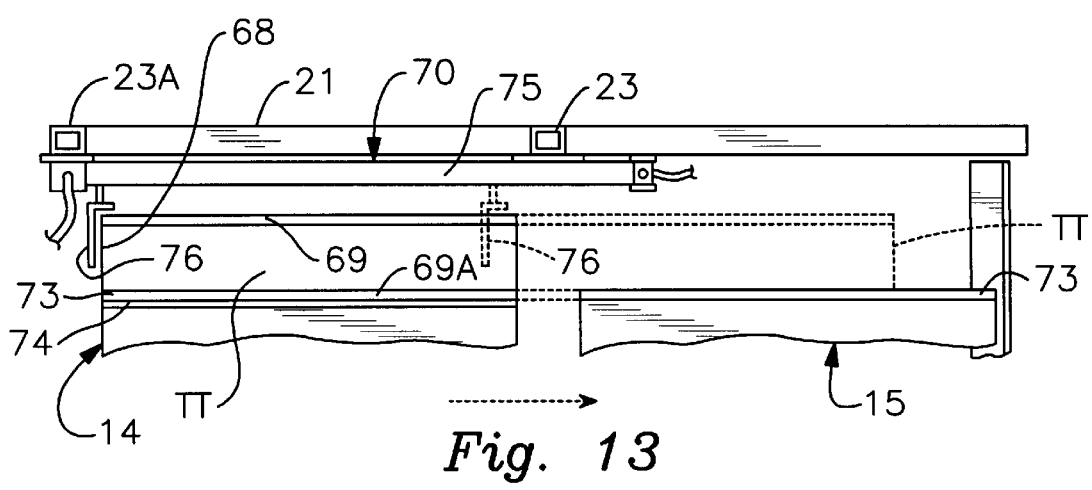
FIG. 13 is a partial end elevational view of the upper tray engagement assembly.

Referring now to FIGS. 1 and 13 of the drawings, the cylinder assemblies 70 can be seen wherein an activation rodless cylinder 75 is suspended from and between the cross support element 23 and frame element 23A. A tray engagement bracket 76 is secured to a drive element extending from the rodless cylinder 75 so as to be engageable with the respective sidewall 68 of the top tray TT in the tray column 14. As previously described, the top tray TT is advanced to the adjacent tray column 15 as illustrated in broken lines in FIG. 13. The rodless cylinder 75 is then recycled repositioning the tray engagement bracket 76 for the next cycle engagement.

Figure 11:
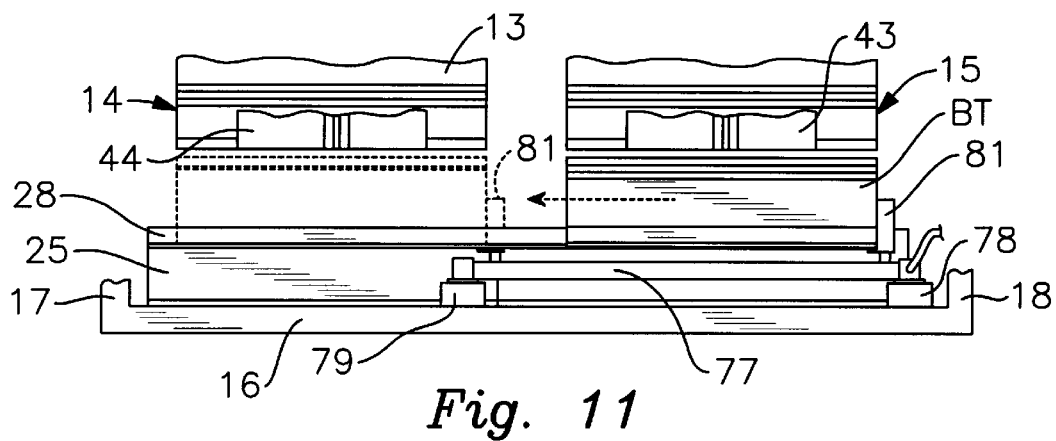
FIG. 11 is a partial side elevational view of a tray engagement assembly for transferring selective trays between tray columns.
Figure 12:
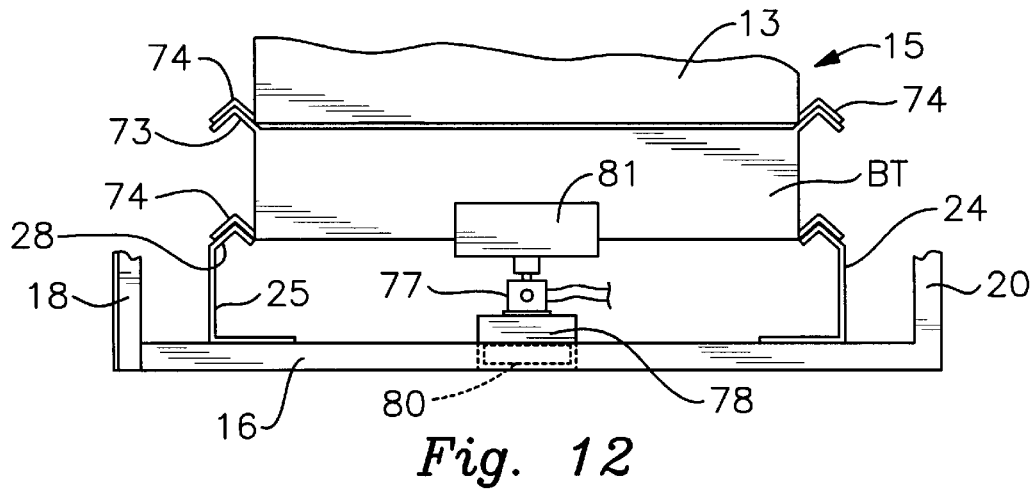
FIG. 12 is a partial end elevational view of the tray engagement assembly shown in FIG. 11.

In FIGS. 11 and 12 of the drawings, a second rodless cylinder 77 is shown positioned on a pair of support blocks 78 and 79 extending from a cross support brace 80 of the main support base 16. A secondary generally L-shaped tray engagement bracket 81 extends from the rodless cylinder 77 repositions the bottom tray BT of the tray column 15 which is resting on the guide tracks 24 and 25 over to the bottom and below the tray column 14 as shown in broken lines. The rodless cylinder 77 is then recycled ready for the next tray of the descending tray column 15 as hereinbefore described.

It will thus be seen that a new and novel indexing parts tray supply device has been illustrated and described and it will be apparent to those skilled in the art that various changes and modifications may be made therein without departing from the spirit of the invention.

Therefore I claim:

1. An indexing parts tray device comprising in combination, a main support frame, a parts tray and a tray engagement assembly, said parts tray having sidewalls, end walls, and an integral bottom, multiple engagement flanges extending from said parts tray, said main support frame comprising a base, a plurality of interconnecting support posts extending therefrom, said tray engagement assembly comprises multiple tray engagement arms on said main support frame, means for advancing said engagement arms for selective registration with said individual parts trays, a first tray column and a second tray column, said tray columns comprised of multiple stacked parts trays and wherein the engagement arms raise and lower respective tray columns, a pair of fixed guide tracks on said main frame base on which said first and second tray columns are registerably positioned, means for transferring said selective parts trays by slideably engaging said fixed guide tracks with the flanges of the trays between said tray columns, and tray column guides extending from said main support frame to slideably guide the trays.

2. The indexing parts tray device of claim 1 wherein said multiple engagement flanges extend from said parts tray comprises, a top elongated flange and a bottom elongated flange.

3. The indexing parts tray device of claim 2 wherein said top and bottom flanges are in vertical spaced relation to one another on said respective parts tray end walls.

4. The indexing parts tray device of claim 1 wherein said parts tray is molded of synthetic resin material.

5. The indexing parts tray device of claim 1 wherein said engagement arms comprise, a generally rectangular body member, a return tray registration flange thereon and spring-urged means extending therefrom.

6. The indexing parts tray device of claim 1 wherein said means for selectively advancing said engagement arms comprises a cam on said respective engagement arms and cam engagement means on said main support frame selectively engageable on said cam and said engagement arms pivotally secured to activation brackets movably positioned on said main support frame by piston and cylinder assembly engaging said brackets.

7. The indexing parts tray device of claim 6 wherein said cam on said engagement arms comprises, a contoured cam surface extending from said engagement arms, said cam surface having a first engagement surface inclination and a second engagement surface.

8. The indexing parts tray device of claim 1 wherein said means for transferring selective parts trays by slideably engaging said fixed guide tracks with the flanges of the trays between said tray columns comprises, a first and second cylinder assembly, said first cylinder assembly comprises a rodless pneumatic cylinder secured to said main frame base, a tray engagement bracket interconnected to said cylinder and a source of compressed fluid under pressure.

9. The indexing parts tray device of claim 8 wherein said second cylinder assembly comprises, a rodless pneumatic cylinder secured to said main frame in spaced relation to said first tray column, a tray engagement bracket interconnected to said cylinder, said tray engagement bracket engageable with the parts tray on the top of said first tray column and a source of compressed fluid under pressure.

10. The indexing parts tray device of claim 1 wherein said pair of guide tracks on said main frame base have an angularly disposed inturned elongated flange portion thereon, said flange portion registerable with some of said engagement flanges extending from said parts tray.

11. The indexing parts tray device of claim 1 wherein said tray column guides comprises, pairs of oppositely disposed upstanding guide angles.

12. The indexing parts tray device of claim 1 wherein some of said upstanding guide angles have tray access notches therein to afford access to said parts trays.

* * * * *